United States Patent [19]

Gotoh

[11] Patent Number: 5,229,675
[45] Date of Patent: Jul. 20, 1993

[54] OUTPUT-TERMINAL DEVICE FOR AN A.C. GENERATOR FOR A VEHICLE

[75] Inventor: Hitoshi Gotoh, Himeji, Japan
[73] Assignee: Mitsubishi Denki K.K., Tokyo, Japan
[21] Appl. No.: 899,257
[22] Filed: Jun. 16, 1992
[30] Foreign Application Priority Data Jul. 5, 1991 [JP] Japan ................... 3-192591

[51] Int. Cl.$^5$ .......................................... H02K 11/00
[52] U.S. Cl. ...................... 310/71; 310/68 D
[58] Field of Search ............. 310/71, 68 D, 89; 322/49; 439/883, 884, 801

[56] References Cited

U.S. PATENT DOCUMENTS

| 4,362,351 | 12/1982 | Wible . |
| 4,679,888 | 7/1987 | Williams . |
| 4,843,267 | 6/1989 | Kaneyuki ................ 310/71 X |

FOREIGN PATENT DOCUMENTS

| 0199504 | 10/1986 | European Pat. Off. . |
| 2629287 | 9/1989 | France . |
| 34146 | 3/1991 | Japan . |
| 2235822 | 3/1991 | United Kingdom . |

OTHER PUBLICATIONS

European Search Report (Dec. 11, 1992), 3 pages.

*Primary Examiner*—Steven L. Stephan
*Assistant Examiner*—Ed To
*Attorney, Agent, or Firm*—Sughrue, Mion, Zinn, Macpeak & Seas

[57] ABSTRACT

An output-terminal device for an a.c. generator for a vehicle includes an output-terminal bolt which has a flat portion at its rear end, a polygonal flange portion at an intermediate portion and a threaded portion at its front end. The output-terminal bolt is connected at its flat portion to a connecting seat which is extended from an output side heat sink of a rectifier device attached to the rear bracket of the a.c. generator. An insulation cover is fitted to the rear bracket and supports an insulation terminal socket provided with a cylindrical portion at which bottom portion a polygonal opening is formed. The polygonal flange portion of the output-terminal bolt is fitted to the polygonal opening.

6 Claims, 5 Drawing Sheets

OUTPUT-TERMINAL DEVICE FOR AN A.C. GENERATOR FOR A VEHICLE

The present invention relates to an output-terminal device for an a.c. generator for a vehicle wherein an output-terminal bolt is extended from the rear bracket of the generator. More particularly, the present invention relates to such output-terminal device for an a.c. generator such that an external wire can be extended in a desired direction.

BACKGROUND OF THE INVENTION

FIG. 3A is a side view of a conventional output-terminal device for an a.c. generator for a vehicle, which is viewed from the rear side of the generator. The a.c. generator is of a rotary magnetic pole type wherein a stator (not shown) is attached with a front bracket 1 and a rear bracket 2. In FIG. 3A, reference numeral 20 designates an output-terminal device provided at an outer end of the rear bracket 2 and the output terminal bolt 21 projects in a lateral direction.

FIG. 3B is a cross-sectional view of the output-terminal device 20, connected to a rectifier device, taken along a line B3—B3 in FIG. 3A. In FIG. 3B, reference numerals 12 and 13 designate an output side (positive pole) heat sink and the other side (negative pole) heat sink of the rectifier device. In FIG. 3B, only connecting portions of the heat sinks are shown. Numeral 16 designates a connecting bolt of the output side which is passed through a wiring board 15 and is forcibly fitted to the connecting portion of the heat sink 12 to have an electric connection. The connecting bolt 16 is passed through an insulation tube 14 and is projected in the axial direction to the rear end of the rear bracket 2. The output-terminal device 20 comprises an insulation terminal socket 22 made of a resinous material and the before-mentioned output-terminal bolt 21 connected to the connecting bolt 16 by means of a nut 17 which is embedded in the socket 22. The rear end of the terminal bolt 21 is formed to have a flat portion 21a. The terminal bolt 21 has a flange portion 21c at an intermediate portion and a threaded portion 21b at its front end which is used for connecting a terminal. The terminal socket 22 has a cylindrical flange portion 22a which projects from its one end where a cut portion 22b is formed. Numeral 24 designates an insulating cap which is fitted to the insulation terminal socket 22 to surround the nut 17. FIG. 3C is a plane view of the output-terminal device 20 shown in FIG. 3A.

FIGS. 3D and 3E are respectively a plane view and a side view partly broken which show the output-terminal bolt 21 to which an external wire is connected. A crimp-style terminal 36 is connected to an external wire 35 by crimping. The crimp-style terminal 36 is fitted to the output-terminal bolt 21 and is fastened to it by means of a nut 37. The terminal 36 is inserted in the cut portion 22b so as to prevent it from turning.

A three-phase a.c. voltage generated in the a.c. generator is rectified into a d.c. voltage by means of the rectifier device and the generated d.c. voltage is outputted.

In the conventional output-terminal device described above, the direction of extending the external wire 35 is different depending on the types of vehicle. Accordingly, the position of the cut portion 22b had to be determined in the insulation terminal socket 22 in correspondence to the direction of extending the external wire 35. There was, therefore, a problem that many kinds of output-terminal devices had to be prepared.

SUMMARY OF THE INVENTION

It is an object of the present invention to eliminate the above-mentioned problem and to provide an output-terminal device for an a.c. generator for a vehicle which requires only one kind of device even when the direction of extending an external wire is different.

In accordance with the present invention, there is provided an output-terminal device for an a.c. generator for a vehicle which comprises an output-terminal bolt comprising a flat portion at the rear end, a polygonal flange portion at an intermediate portion and a threaded portion for fitting a terminal which connects an external wire; an insulation terminal socket having a cylindrical portion with a bottom at its one end in which a polygonal opening is formed in the bottom so that the polygonal flange portion of the output-terminal bolt is fitted to the polygonal opening at a desired angle position, and a cut portion is formed at a part of the free end of the cylindrical portion; a connecting seat which is extended from an output side heat sink of a rectifier device attached to the rear bracket of an a.c. generator and which is attached with the flat portion of the output-terminal bolt by means of a connecting bolt, and an insulation cover which is fitted to the rear bracket and which supports the insulation terminal socket in which the polygonal flange portion is fitted to the polygonal opening, wherein a terminal connecting an external wire is fitted to the threaded portion of the output-terminal bolt while the terminal is inserted into the cut portion to prevent the turning of the same, and the cut portion of the insulation terminal socket is positioned in correspondence to the direction of extending the external wire.

A polygonal flange portion is formed in an intermediate portion of the output-terminal bolt extending outwardly from the rear bracket of the a.c. generator. An insulation terminal socket 53 having a polygonal opening is fitted to the polygonal flange portion of the output-terminal bolt by determining the position of a cut portion formed in the socket depending on the direction of extension of an external wire, whereby a single output-terminal bolt can be used regardless of the direction of extending the external wire and the terminal attached to the external wire is passed through the cut portion for the purpose of preventing the turning of the terminal.

DETAILED DESCRIPTION OF THE PREFERRED EMBODIMENT

A preferred embodiment of the output-terminal device for a.c. generator for a vehicle according to the present invention will be described in more detail with reference to the drawings.

Figure 1A:
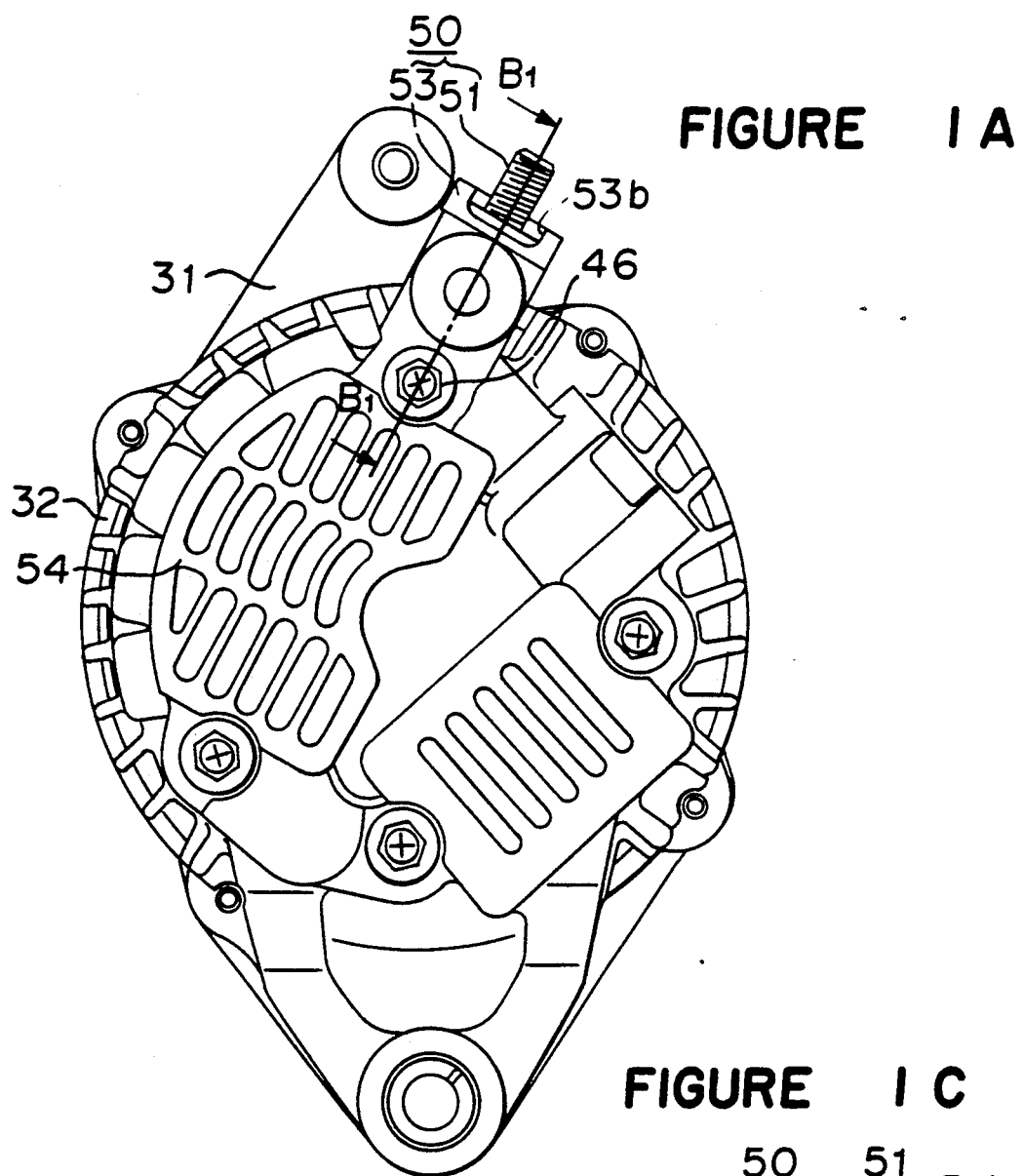
FIG. 1A is a side view of an embodiment of the output-terminal device for an a.c. generator for a vehicle according to the present invention, which is viewed from the rear side of the generator.
Figure 1C:
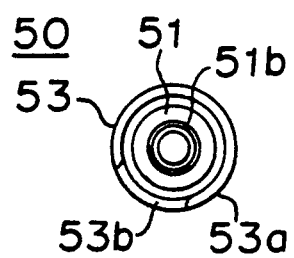
FIG. 1C is a plane view of the output-terminal device shown in FIG. 1A.

FIG. 1A shows an embodiment of the output-terminal device for an a.c. generator for a vehicle according to the present invention.

In FIG. 1A, a stator (not shown) for an a.c. generator is connected to a front bracket 31 and a rear bracket 32 so that a rotor (not shown) is supported by both brackets by the aid of bearings (not shown). A rectifier device (not shown) is attached to the rear bracket 32. Numeral 50 designates an output-terminal device which is connected to a heat sink having a positive pole (output side) of the rectifier device. The output-terminal device 50 has an output-terminal bolt 51 which is extended to a lateral direction of the generator.

Figure 1B:
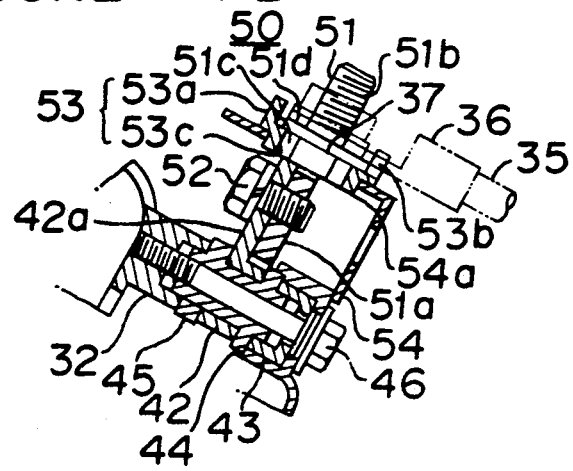
FIG. 1B is a cross-sectional view of the output-terminal device taken along a line B1—B1 in FIG. 1A.

The output-terminal device 50 connected to the output side of the rectifier device is shown in FIG. 1B in cross section. Numerals 42 and 43 designate heat sinks of an output side (having a positive pole) and the other side (having a negative pole) of the rectifier device. In FIG. 1B, only connecting portions of the heat sinks are shown. A connecting seat 42a is projected from the connecting portion of the output side heat sink 42. Numeral 44 designates an insulation tube fitted to the connecting portion of the heat sink 42, and numeral 45 designates a wiring board in which wirings are embedded. In FIG. 1B, only the connecting portion of the wiring board 45 is shown and the insulation tube 44 is inserted in the hole formed in the wiring board. Numeral 46 designates a connecting bolt for connecting the connecting portion of the heat sinks 42, 43 and the wiring board 45 to the rear bracket 32.

The output-terminal device 50 has a construction as follows. The output-terminal bolt 51 has a flat portion 51a at its rear end portion, which is connected to the connecting seat 42a by means of a bolt 52, a hexagonal flange portion 51c and a circular seat portion 51d at its intermediate portion, wherein the circular seat portion 51d is formed on the hexagonal flange portion 51c, and a threaded portion 51b for connecting a terminal at its front end. Numeral 53 designates an insulation terminal socket which has a cylindrical portion 53a at its end. A hexagonal opening 53c which is fitted to the hexagonal flange portion 51c of the output-terminal bolt 51 is formed in the bottom portion. A cut portion 53b is formed at a part of the free end of the cylindrical portion 53a. Numeral 54 designates an insulation cover attached to the rear bracket 32 by means of the connecting bolt 46 so as to surround the rear end of the rear bracket 32. The terminal socket 53 is fitted to a circular opening 54a formed at a side portion of the insulation cover 54 so that the terminal socket 53 is turnable in the circular opening 54a.

Figure 2A:
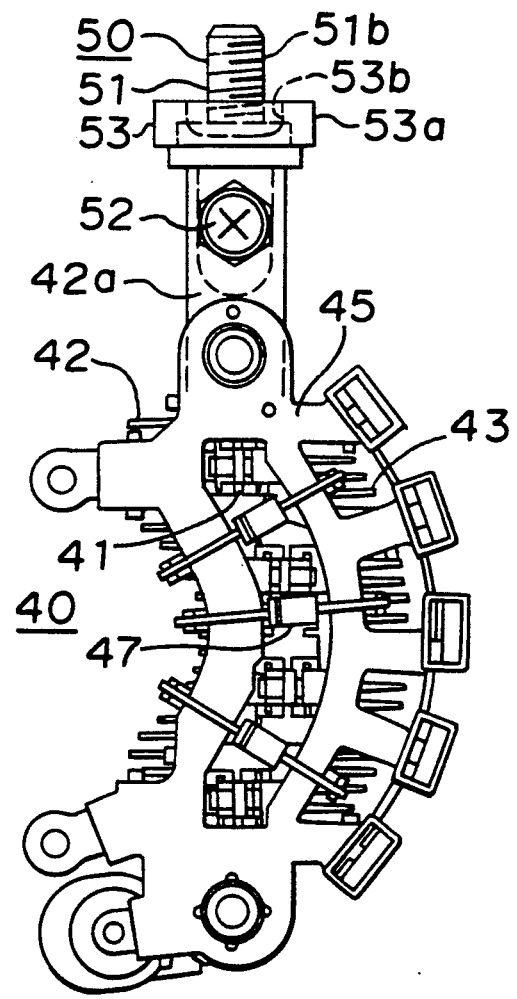
FIG. 2A is a side view of a rectifier device and the output-terminal device shown in FIG. 1A, which is viewed from the front side.
Figure 2B:
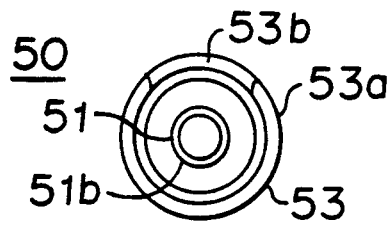
FIG. 2B is a plane view of the output-terminal device shown in FIG. 2A.
Figure 2F:
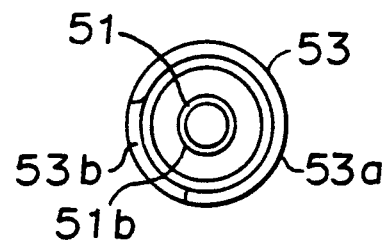
FIGS. 2E through 2I are respectively plane views showing the states that the insulation terminal socket of the output-terminal device in FIG. 2B is successively moved by an angle of 30°.
Figure 2C:
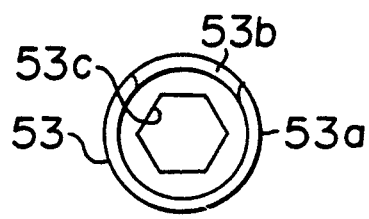
FIG. 2C is a plane view of an insulation terminal socket shown in FIG. 2A.
Figure 2G:
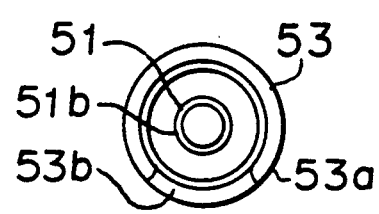
Figure 2D:
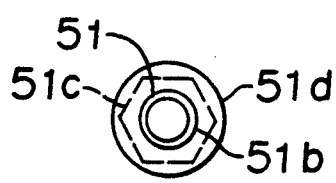
FIG. 2D is a plane view of an output-terminal bolt shown in FIG. 2A.
Figure 2H:
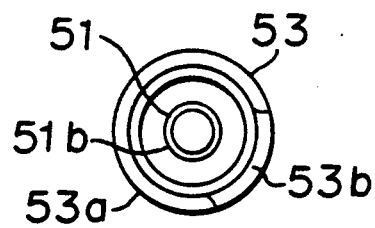
Figure 2E:
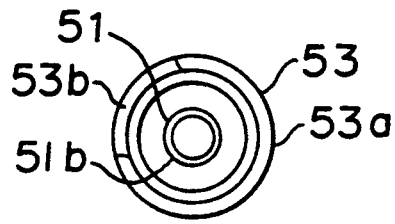
Figure 2I:
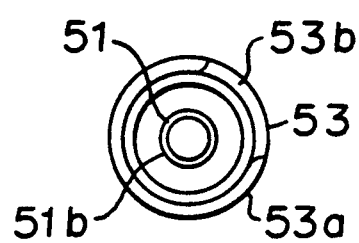
Figure 3A:
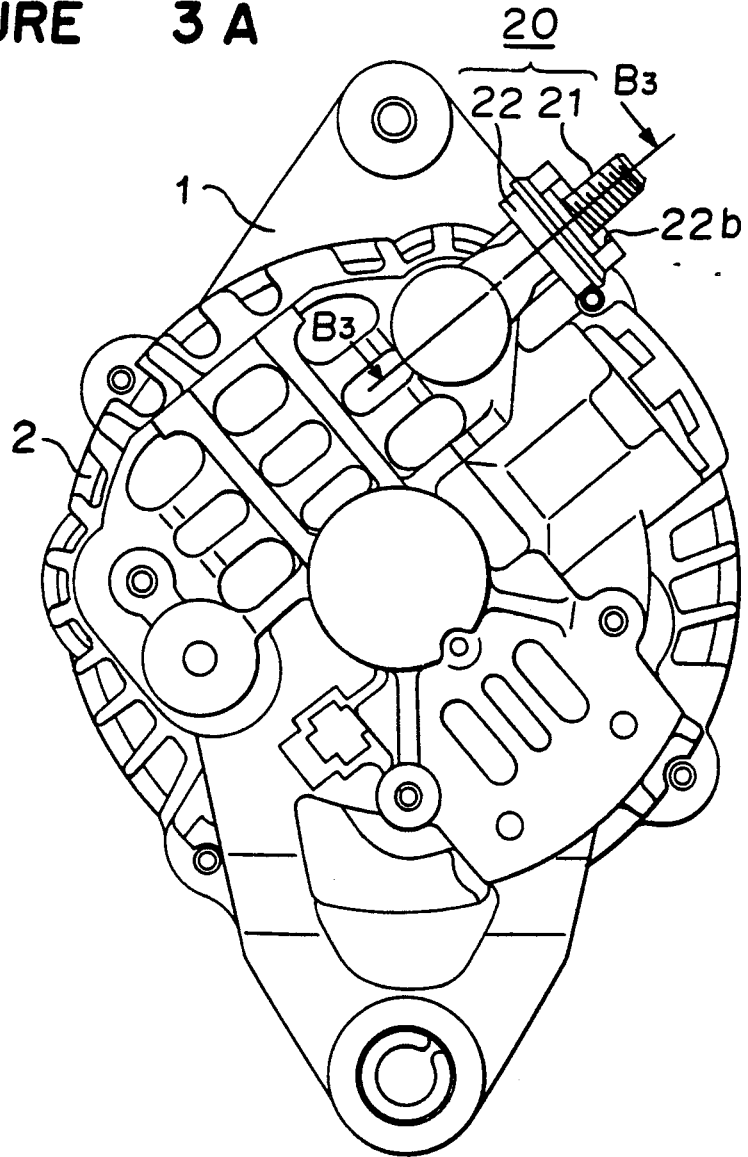
FIG. 3A is a side view of a conventional output-terminal device for an a.c. generator for a vehicle, which is viewed from the back side of the generator.
Figure 3B:
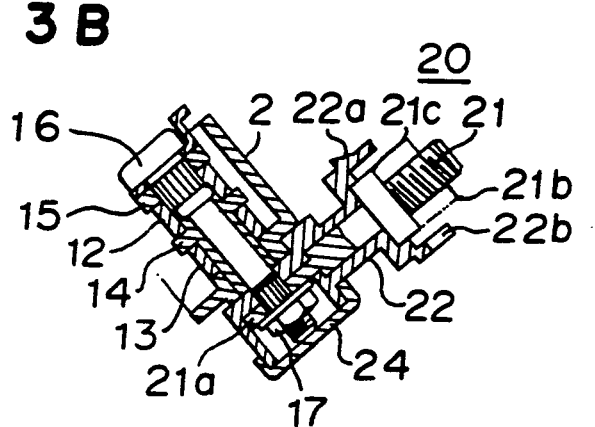
FIG. 3B is a cross-sectional view taken along a line B3—B3 in FIG. 3A.
Figure 3C:
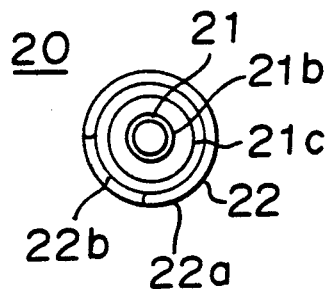
FIG. 3C is a plane view of the output-terminal device 10 shown in FIG. 3A.
Figure 3D:
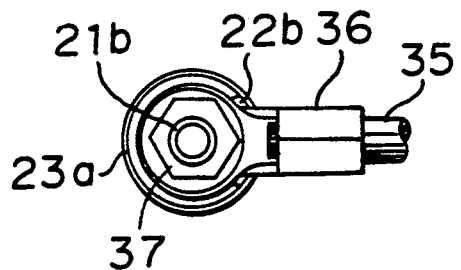
FIGS. 3D and 3E are respectively a plane view and a cross-sectional view showing that a terminal for an external wire is attached to the output-terminal bolt shown in FIG. 3B.
Figure 3E:
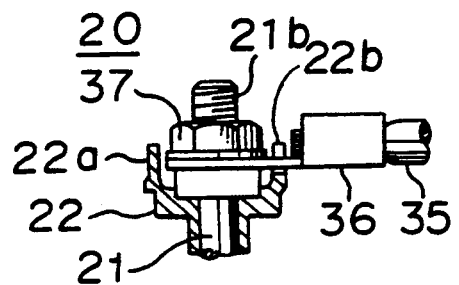

FIG. 2A shows a rectifier device 40 to which the output-terminal device 50 is fixed, which is viewed from the front side. A plurality of main diodes 41 are disposed in the rear of the wiring board 45. The main diodes 41 are attached to the output side (positive pole) heat sink 42 and the other side (negative pole) heat sink 43. Numeral 47 designates a small-sized diode. FIG. 2B is a plane view of the output-terminal device 50; FIG. 2C is a plane view of the insulation terminal socket 53, and FIG. 2D is a plane view of the output-terminal bolt 51.

In the insulation terminal socket 53, it is possible to change the position of the cut portion 53b depending on the direction of extending the external wire 35. FIG. 2B and FIGS. 2E through 2I respectively show the output-terminal device in which the cut portion 53b is determined to have different positions. The terminal socket 53 can be connected to the output-terminal bolt 51 by turning the hexagonal flange portion 51C to the hexagonal opening 53c by an angle of 30°. In this case, the position of the cut portion 53b is changed by the same angle. The crimp-style terminal 36 is inserted into the cut portion 53b which is determined in correspondence to the direction of extending the external wire 35.

In the above-mentioned embodiment, the output-terminal bolt 51 and the terminal socket 53 respectively have the hexagonal flange and the hexagonal opening. However, the flange portion and the opening may have a polygonal shape other than a hexagonal shape.

As described above, in accordance with the present invention, a flat portion formed at the rear end of an output-terminal bolt is connected to a connecting seat extending from a connecting portion at an end of a heat sink of a rectifier device; the output-terminal bolt is provided with a polygonal flange portion at an intermediate portion and a threaded portion for connecting a terminal at its front end; an insulation terminal socket is provided with a polygonal opening at the bottom portion of a cylindrical portion and a cut portion is formed at a part of the edge of the cylindrical portion; the polygonal flange portion of the output-terminal bolt is fitted to the polygonal opening of the insulation terminal socket; a terminal for an external wire is inserted into the cut portion of the terminal socket and the terminal is connected to the threaded portion of the terminal bolt. Accordingly, the position of the cut portion of the terminal socket can be changed depending on the direction of extending the external wire, and it is enough to use a single kind of output-terminal device regardless of the direction of extending the external wire.

I claim:

1. An output-terminal device for an a.c. generator for a vehicle, said output-terminal device being adapted to be secured to a rectifier device attached to a rear bracket of said a.c. generator, said output-terminal device comprising:

an output-terminal bolt comprising a flat portion at a first end thereof, a polygonal flange portion at an intermediate portion and a threaded portion for fitting a terminal which connects to an external wire;

an insulating terminal socket having a cylindrical portion with a bottom at a first end, said cylindrical portion having a polygonal opening formed in the bottom so that the polygonal flange portion of the output-terminal bolt is fitted to the polygonal opening of the insulating terminal socket at a desired angular position relative to the output-terminal bolt, and a cut portion is formed at a part of a second end of the cylindrical portion;

a connecting seat, said connecting seat extending from an output side heat sink of the rectifier device;

means for attaching the connecting seat to the flat portion of the output-terminal bolt; and an insulating cover which is fitted to the rear bracket and which supports the insulating terminal socket in which the polygonal flange is fitted to the polygonal opening, wherein the terminal connected to the external wire is fitted to the threaded portion of the output-terminal bolt as the terminal is inserted into the cut portion to prevent the turning of the terminal, the cut portion of the cylindrical portion of the insulating terminal socket being adjustably positioned in correspondence to the direction of extension of the external wire.

2. The output-terminal device according to claim 1, wherein the polygonal flange portion and the polygonal opening are respectively formed to have a hexagonal shape.

3. The output-terminal device according to claim 1, wherein said attaching means comprises a bolt.

4. An output-terminal device according to claim 1, wherein said cut portion of said cylindrical portion of said insulating terminal socket is rotatable so as to change the position of the cut portion in correspondence to the direction of extension of the external wire.

5. An output-terminal device according to claim 1, wherein said terminal socket is connected to the output-terminal bolt by turning the polygonal flange portion to the polygonal opening by a predetermined angle, thereby changing the position of the cut portion by said predetermined angle.

6. An output-terminal device according to claim 1, wherein said terminal socket is fitted in a circular opening formed in a side portion of said insulating cover, said terminal socket being rotatable in the circular opening.

* * * * *